(12) United States Patent
Bae et al.

(10) Patent No.: US 9,557,161 B2
(45) Date of Patent: Jan. 31, 2017

(54) METHOD AND APPARATUS FOR MEASURING SIZES OF OBJECTS IN IMAGE (75) Inventors: Byeong-Sook Bae, Seoul (KR); Jong-Cheol Ghim, Seoul (KR); Young-Hun Hwang, Seoul (KR)

(73) Assignee: KT Corporation, Seongnam (KR)

( * ) Notice: Subject to any disclaimer, the term of this patent is extended or adjusted under 35 U.S.C. 154(b) by 991 days.

(21) Appl. No.: 13/308,139

(22) Filed: Nov. 30, 2011

(65) Prior Publication Data

US 2012/0169868 A1 Jul. 5, 2012

(30) Foreign Application Priority Data

Dec. 31, 2010 (KR) .................. 10-2010-0140786

(51) Int. Cl.
*H04N 7/18* (2006.01)
*G01B 11/02* (2006.01)
*G01C 11/30* (2006.01)
*G06T 7/60* (2006.01)

(52) U.S. Cl.
CPC ............. *G01B 11/024* (2013.01); *G01C 11/30* (2013.01); *G06T 7/60* (2013.01); *H04N 7/18* (2013.01); *G06T 2207/30164* (2013.01)

(58) Field of Classification Search
None
See application file for complete search history.

(56) References Cited

U.S. PATENT DOCUMENTS 4,791,482 A * 12/1988 Barry et al. ............. 348/136
5,805,289 A * 9/1998 Corby et al. ............. 356/613
6,535,223 B1 * 3/2003 Foley ...................... 345/629
7,283,657 B1 * 10/2007 Carlson ................... 382/141
7,293,368 B1 * 11/2007 Faulk et al. .............. 33/758
8,073,201 B2 * 12/2011 Satoh et al. .............. 382/106
8,100,554 B2 * 1/2012 Wei et al. ................. 362/241
2005/0052558 A1 * 3/2005 Yamazaki et al. ...... 348/333.12
2006/0187333 A1 * 8/2006 Kobayashi et al. ..... 348/333.01
2008/0247596 A1 * 10/2008 Nishiuchi ................ 382/100
2008/0301986 A1 * 12/2008 Quin ........................ 40/446
2009/0268214 A1 * 10/2009 Lucic et al. .............. 356/614
2010/0020560 A1 * 1/2010 Padilla ..................... 362/490
2010/0074609 A1 * 3/2010 Kasama et al. .......... 396/147
2011/0157230 A1 * 6/2011 Davydov .................. 345/649

* cited by examiner

*Primary Examiner* — Joseph Ustaris
*Assistant Examiner* — Edemio Navas, Jr.
(74) *Attorney, Agent, or Firm* — Sughrue Mion, PLLC (57) ABSTRACT

Method and apparatus for measuring sizes of objects by using photograph. Method includes taking photograph by using camera; recognizing reference scale in photograph and measuring size of reference scale; measuring vertical direction angle and horizontal direction angle between the camera and the objects by using image properties of the recognized reference scale; recognizing the objects in the photograph and measuring vertical sizes and horizontal sizes of the objects; and acquiring actual vertical sizes and actual horizontal sizes of the objects by compensating the measured vertical size and the measured horizontal size of the objects based on the size of the reference scale, the actual size of the reference scale, and the vertical and horizontal direction angles. Therefore, heights and widths of objects distributed throughout a wide area may be precisely measured regardless of positions of the objects by using a reference scale for comparatively measuring sizes of the objects.

8 Claims, 9 Drawing Sheets

METHOD AND APPARATUS FOR MEASURING SIZES OF OBJECTS IN IMAGE

CROSS-REFERENCE TO RELATED PATENT APPLICATION

This application claims the benefit of Korean Patent Application No. 10-2010-0140786, filed on Dec. 31, 2010, in the Korean Intellectual Property Office, the disclosure of which is incorporated herein in its entirety by reference.

BACKGROUND OF THE INVENTION

1. Field of the Invention

The present invention relates to a method and an apparatus for measuring sizes of objects by using a camera or a CCTV camera, and more particularly, to a method and an apparatus for precisely and quickly measuring heights and widths of a plurality of objects by using a photograph taken by using a single camera.

2. Description of the Related Art

The basic method of measuring height and width of an object is directly measuring the height and the width of the object by using a ruled scale to the object. Height and width of an object may also be indirectly measured by multiplying a distance and an angle by a magnification ratio. In this case, if the distance to the object is sufficiently larger than size of the object, error due to angle is very subtle.

Furthermore, size of an object may be measured by taking a photograph of the object and measuring size in the photograph.

Figure 1:
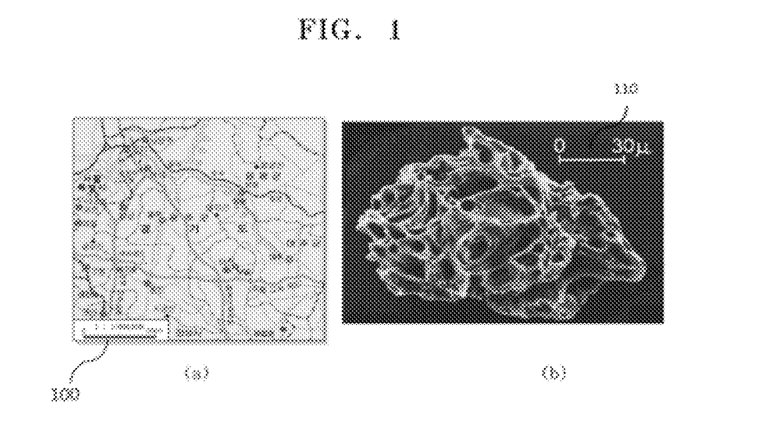
FIG. 1 is a diagram showing that length of an object is measured by using a photograph of the object.

FIG. 1 is a diagram showing that length of an object is measured by using a photograph of the object. Here, to find out actual size of an object, it is necessary to know a reduction ratio or a magnification ratio of the photograph. In a case of a map or an aerial photograph as shown in FIG. 1(A), if a reduction ratio 100 is known, size of an object may be induced by multiplying a distance in a photograph by the reduction ratio 100. For another example, in a case of an electron microscopic photograph or a microscopic photograph as shown in FIG. 1(B), size of an object may be induced by marking a reference length 110 in a portion of a photograph, measuring size of an object by using a scale, and comparing the measured size to the reference length. In the same regard, an object in a general photograph may be measured.

Figure 2:
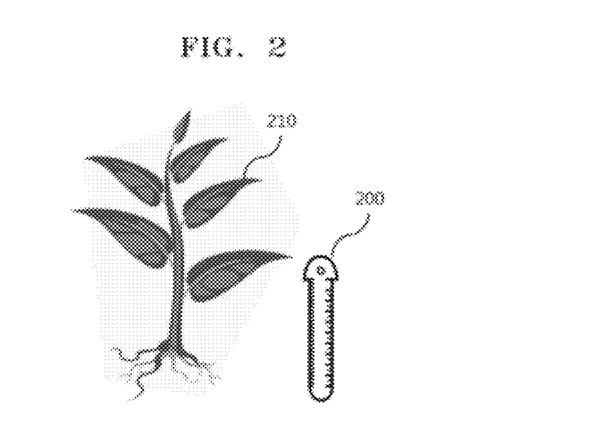
FIG. 2 is a diagram showing a reference scale for measuring a length next to an object.

FIG. 2 is a diagram showing a reference scale for measuring a length next to an object.

As shown in FIG. 2, size of an object 210 may be measured by arranging a reference scale 200 with a known size next to the object 210 to be measured, photographing the reference scale 200 and the object 210 together, and measuring size of the object 210 by measuring size of the object 210 in a photograph by using a ruled scale and comparing the measured size of the object 210 in the photograph to that of the reference scale 200. The method is effective in a case where it is difficult to use a ruled scale or it is easy to photograph an object. Using a fixed camera or a CCTV camera which may adjust its angle and magnification ratio, sizes of a plurality of objects distributed throughout a wide area may be precisely measured by using a single camera. In other words, objects to be measured may be photographed at a suitable magnification ratio with a reduced measurement error by adjusting angles and magnification ratio of a camera. In this case, costs and efforts may be reduced as compared to a case in which a camera is arranged for each of objects to be measured or moved for photographing each of the objects to be measured. However, in a case of periodically photographing an object with changing sizes, e.g., vegetables, a lot of effort is necessary.

Furthermore, due to properties of photographs, many errors occur according to positions of objects in a method using a single camera.

Figure 3:
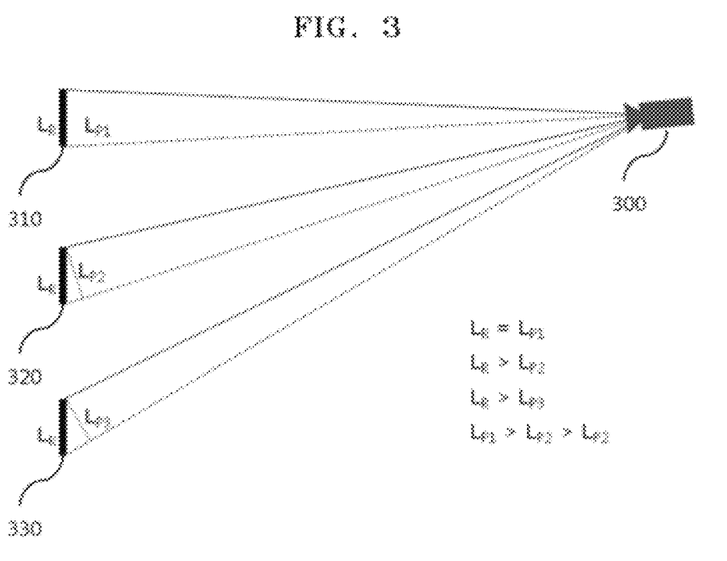
FIG. 3 is a diagram showing that length of an object is distorted while the object is being photographed, according to height of a camera.

FIG. 3 is a diagram showing that length of an object is distorted while the object is being photographed, according to height of a camera.

To precisely measure size of an object by using a photograph, it is necessary for an object 310 and a camera 300 to form a right angle as shown in FIG. 3(A). If other objects 320 and 330 are arranged, a length measured by using a photograph becomes smaller than an actual length. In a case of measuring lengths only in a vertical direction, it is not necessary for an object and a camera to form a right angle, and a reference scale as shown in FIG. 2 may be used. Since both a reference scale and objects are shown to be shorter than actual heights, heights of objects may be measured by using a magnification ratio regarding the reference scale. However, in a case of measuring a horizontal length by using a vertical reference scale, the absolute value of the horizontal length cannot be measured by using a magnification ratio of the reference scale. On the contrary, a vertical length cannot be measure precisely by using a horizontal reference scale. To resolve the problems, it is necessary to use both a horizontal reference scale and a vertical reference scale.

However, a method using both a horizontal reference scale and a vertical reference scale is not only complicated, but also has a problem that it is necessary to recognize both the horizontal reference scale and the vertical reference scale. Therefore, measurement becomes complex and erroneous. The problem becomes more significant in a case of continuously measuring size of an object, such as a continuously growing plant.

Therefore, a technique for precisely measuring size of an object by using a single reference scale is highly demanded.

SUMMARY OF THE INVENTION

The present invention provides a method and an apparatus for precisely measuring heights and widths of objects distributed throughout a wide area regardless of positions of the objects by using a spherical reference scale for comparatively measuring sizes of the objects, after the objects are photographed by using a single camera or a CCTV camera.

According to an aspect of the present invention, there is provided a method of measuring sizes of objects in a photograph including the objects and a reference scale, the method including taking the photograph by using a camera; recognizing the reference scale in the photograph and measuring size of the reference scale; measuring vertical direction angle and horizontal direction angle between the camera and the objects by using image properties of the recognized reference scale; recognizing the objects in the photograph and measuring vertical sizes and horizontal sizes of the objects; and acquiring actual vertical sizes and actual horizontal sizes of the objects by compensating the measured vertical size and the measured horizontal size of the objects based on the size of the reference scale, the actual size of the reference scale, and the vertical and horizontal direction angles.

The method further includes repeatedly photographing the objects a predetermined period of time after the step of compensating the measured vertical size and the measured horizontal size of the objects.

The reference scale is a right-polygon having a plurality of surfaces with a same shape and a same size, and the step of measuring direction angles includes determining the largest surface or a surface having the least distorted shape from among surfaces of the recognized reference scale as a reference surface; and measuring the vertical and horizontal direction angles by using the reference surface.

The reference scale includes a light source arranged at a sphere center; and a plurality of holes that are formed on the surface of the reference scale and are apart from each other at a regular interval, and the step of measuring direction angles includes measuring intensity of light emitted through recognized holes and determining a hole through which light with the greatest intensity is emitted as a reference hole; and measuring the vertical and horizontal direction angles by using the reference hole.

The reference scale is a sphere in which concavityconcavities are formed on the surface of the reference scale and are apart from each other at a regular interval, and the step of measuring direction angles includes determining the brightest concavity in a case where a light source is arranged at a same orientation as the camera or the darkest concavity in a case where the light source is arranged at an orientation opposite to that of the camera as a reference concavity; and measuring the vertical and horizontal direction angles by using the reference concavity.

The step of compensating the measured vertical size and the measured horizontal size of the objects includes measuring the vertical size according to an equation $$\frac{L_P}{\sin\theta}\left(\frac{L_{RR}}{L_R}\right)$$

(where θ indicates the vertical direction angle, $L_P$ indicates measured vertical size of an object, $L_R$ indicates measured size of a reference scale, and $L_{RR}$ indicates the actual size of the reference scale); and measuring the horizontal size according to an equation $$\frac{L_W}{\sin\theta}\left(\frac{L_{RR}}{L_R}\right)$$

(where θ indicates the horizontal direction angle, $L_W$ indicates measured horizontal size of an object, $L_R$ indicates the measured size of the reference scale, and $L_{RR}$ indicates the actual size of the reference scale).

According to another aspect of the present invention, there is provided an apparatus for measuring sizes of objects in a photograph including the objects and a reference scale, the apparatus including a photographing unit which takes the photograph by using a camera; a reference scale measuring unit which recognizes the reference scale in the photograph and measures size of the reference scale; a direction angle measuring unit which measures vertical direction angle and horizontal direction angle between the camera and the objects by using image properties of the recognized reference scale; a size compensating unit which recognizes the objects in the photograph, measures vertical sizes and horizontal sizes of the objects, and acquires actual vertical sizes and actual horizontal sizes of the objects by compensating the measured vertical size and the measured horizontal size of the objects based on the size of the reference scale, the actual size of the reference scale, and the vertical and horizontal direction angles; and a central control unit for controlling the above-stated components.

The reference scale is a right-polygon having a plurality of surfaces with a same shape and a same size, and the direction angle measuring unit is a unit for determining the largest surface or a surface having the least distorted shape from among surfaces of the recognized reference scale as a reference surface and for measuring the vertical and horizontal direction angles by using the reference surface.

The reference scale includes a light source arranged at a sphere center; and a plurality of holes that are formed on the surface of the reference scale and are apart from each other at a regular interval, and the direction angle measuring unit is a unit for measuring intensity of light emitted through recognized holes and determining a hole through which light with the greatest intensity is emitted as a reference hole and for measuring the vertical and horizontal direction angles by using the reference hole.

The reference scale is a sphere in which concavityconcavities are formed on the surface of the reference scale and are apart from each other at a regular interval, and the direction angle measuring unit is a unit for determining the brightest concavity in a case where a light source is arranged at a same orientation as the camera or the darkest concavity in a case where the light source is arranged at an orientation opposite to that of the camera as a reference concavity and for measuring the vertical and horizontal direction angles by using the reference concavity.

The size compensating unit measures the vertical size according to an equation $$\frac{L_P}{\sin\theta}\left(\frac{L_{RR}}{L_R}\right)$$

(where θ indicates the vertical direction angle, $L_P$ indicates measured vertical size of an object, $L_R$ indicates measured size of a reference scale, and $L_{RR}$ indicates the actual size of the reference scale), and the size compensating unit measures the horizontal size according to an equation $$\frac{L_W}{\sin\theta}\left(\frac{L_{RR}}{L_R}\right)$$

(where θ indicates the horizontal direction angle, $L_W$ indicates measured horizontal size of an object, $L_R$ indicates the measured size of the reference scale, and $L_{RR}$ indicates the actual size of the reference scale).

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail by explaining preferred embodiments of the invention with reference to the attached drawings. As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of related art are omitted when it is deemed that they may unnecessarily obscure the essence of the invention. Like reference numerals denote like elements.

In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Figure 4:
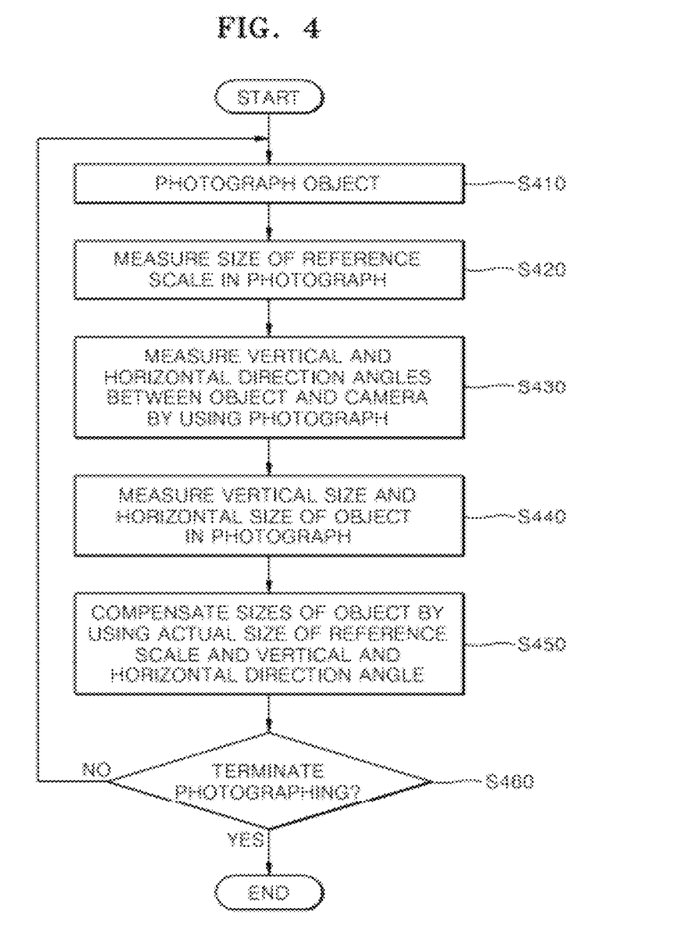
FIG. 4 is a schematic flowchart showing a method of measuring sizes of objects according to an embodiment of the present invention.

FIG. 4 is a schematic flowchart showing a method of measuring sizes of objects according to an embodiment of the present invention.

First, a photograph is taken by using a camera (operation S410). The photograph includes an object and a reference scale having a predetermined length.

Next, the reference scale is recognized in the photograph, and size of the recognized reference scale is measured (operation S420). To recognize the reference scale in the photograph, various conventional image processing techniques may be applied. Measured size of the reference scale is smaller than the actual size of the reference scale, and a relationship between the measured size and the actual size is used later for compensating size of the object.

After size of the reference scale is measured, vertical direction angle and horizontal direction angle between the camera and the object are measured by using image properties of the recognized reference scale (operation S430). A reference scale according to the present invention may include a plurality of surfaces having a same shape or may include holes or protrusions that are apart from each other at a regular interval. In the operation S430 for measuring direction angles, reference surfaces, a reference holes, or reference protrusions are detected from the photograph including the reference scale. Next, vertical and horizontal direction angles of the camera are measured by using the detected references. A method of determining vertical and horizontal direction angles will be described below with reference to following drawings.

After vertical and horizontal direction angles are measured, the object is recognized from the photograph, and vertical size and horizontal size of the recognized object are measured (operation S440). Here, the measured vertical size and the horizontal size are distorted by a distance and direction angles between the camera and the object. Therefore, the measures sizes of the object is compensated by using the relationship between the measured size of the reference scale and the actual size of the reference scale and the measured direction angles (operation S450). Detailed description of the compensation will be given below with reference to FIGS. 10 and 11.

Next, it is determined whether to take a photograph again or not (operation S460). Therefore, sizes of a continuously growing plant, for example, may be periodically measured at ease.

In the method of measuring sizes of objects according to the present invention, a spherical or right-polygonal reference scale is employed. Reasons thereof will be described below.

Figure 5:
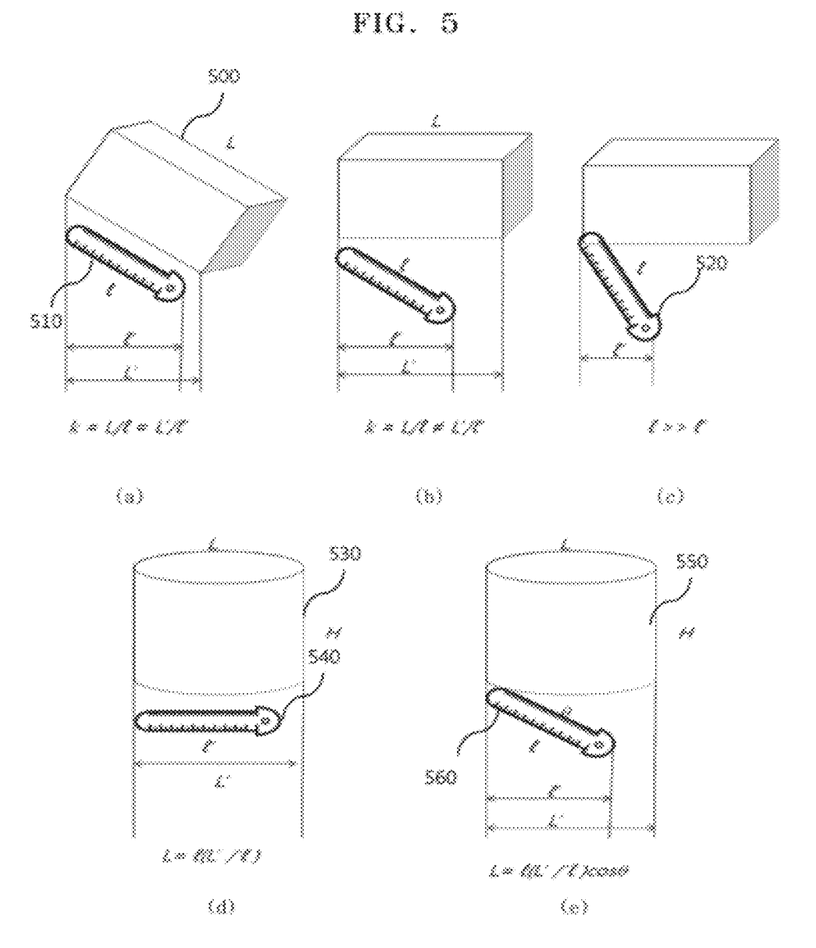
FIG. 5 is a diagram showing a relationship between actual lengths and on-the-photograph lengths according to directions in which an object and a conventional reference scale are arranged.

FIG. 5 is a diagram showing a relationship between actual lengths and on-the-photograph lengths according to directions in which an object and a conventional reference scale are arranged. As shown in FIG. 5, errors occur due to direction angles between the reference scale and the object when the reference scale is neither a sphere nor a right-polygon. In this case, there are three problems.

First, when a reference scale 500 and an object 410 are arranged in parallel to each other as shown in FIG. 5(*a*), size of the object 410 may be measured by comparing sizes of the reference scale 500 and the object 410 with each other. However, in cases as shown in FIG. 5(*b*) and FIG. 5(*c*), it is necessary to know angles between objects and a reference scale. Therefore, to resolve the problem, it is necessary to either measure angles and distances between objects and a camera in advance or arrange a ruled scale. In case of the former, it is difficult to precisely measure distances and angles for all objects and it is necessary to re-measure distances and angles when an object is moved or another object is to be measured. In a case of arranging ruled scales, it is necessary to arrange fixed ruled scales according to directions of a camera to precisely measure heights and widths simultaneously. Furthermore, if a distance between a camera and a rule scale is excessively large, ruled scales may not be read accurately even if a photograph is magnified.

Second, if an angle between a reference scale or an object and a camera is not the right angle and is an acute angle, errors become greater. As shown in FIG. 5(*c*), if a reference scale 520 is significantly tilted toward a camera, errors in length of the reference scale 520 on the photograph increases, unless the length of the reference scale 520 is measured very precisely.

Third, in a case where one direction is specified while another direction is not specified, there is a problem for measuring lengths in two directions. In cases as shown in FIG. 5(*d*) and FIG. 5(*e*), objects 530 and 550 are cylindrical. Here, heights of the objects 530 and 550 may be measured by comparing them to that of the reference scale shown in the photographs. However, the diameter of a cylinder may be measured precisely only when a reference scale 540 and a camera form the right angle as shown in FIG. 5(*d*).

However, a reference scale 560 and an object 550 are likely to be arranged as shown in FIG. 5(e). In other words, even though a ruled scale may be arranged in parallel to vertical and horizontal directions when vertical and horizontal directions are clear as shown in FIG. 5(a), FIG. 5(b), and FIG. 5(c), it is practically difficult to arrange a ruled scale with respect to a spherical or cylindrical object. In such cases, it is necessary to know direction angles between a reference scale and a camera.

Therefore, it is necessary to use a reference scale with which distances and angles according to photographing positions may be easily secured or distances and angles may easily be found out when objects are photographed. To resolve the problem, a sphere or substantial right-polygon is used as a reference scale according to the present invention.

Figure 6:
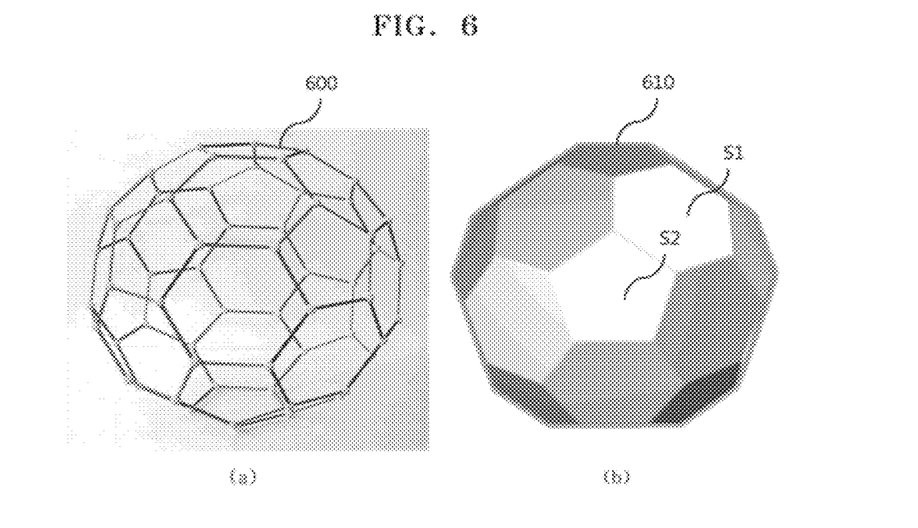
FIG. 6 shows embodiments of reference scales that may be used according to the present invention.

FIG. 6 shows embodiments of reference scales that may be used according to the present invention.

FIG. 6(a) shows a truncated icosahedrons, which is a substantial right-polygon similar to a sphere, and FIG. 6(b) shows that a surface S2 of the truncated icosahedrons is perpendicular to a camera.

Diameter of a right-polygon is constant regardless of viewing angles. In other words, a constant reference length may be provided regardless of relative positions of a camera and a target object by using diameter of a right-polygon as a reference scale. Furthermore, angles between an object and a camera may be easily measured by using a sphere or a substantial right-polygon similar to a sphere.

In case of a substantial right-polygon as shown in FIG. 6, the largest surface or the flattest surface from among a plurality of surfaces of the substantial right-polygon becomes a surface forming the right angle with respect to a camera. In FIG. 6, a surface 014 shows smaller distortion as compared to those of the surface S2 or the other surfaces S1. Therefore, an angle between the substantial right-polygon and the camera may be determined based on the surface 014. Here, information regarding angle relationship of surfaces constituting a reference scale 610 may be utilized, and the information may be acquired based on geometric structure of the right-polygon. Therefore, not only a size of a reference scale, but also vertical and horizontal angles between an object and a camera may be easily measured by using the reference scale shown in FIG. 6.

However, unless the angle between each of surfaces of a polygon is very small, it is difficult to acquire precise values. In case of the truncated icosahedrons shown in FIG. 6, the angle between surfaces is 30 degrees, which is too large to determine a precise results. To resolve the problem, a spherical reference scale may be employed.

Figure 7A:
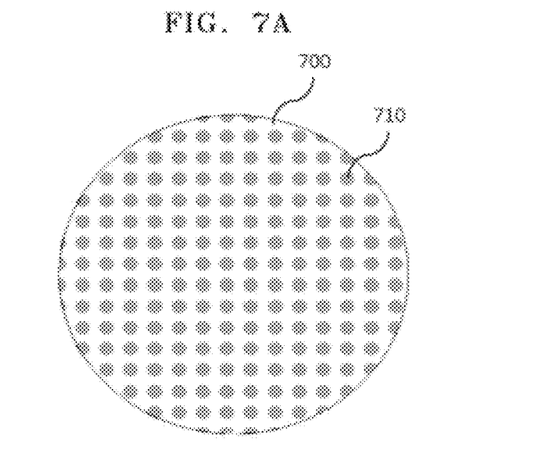
FIGS. 7A, 7B, and 7C are diagrams showing embodiments using spheres as reference scales.
Figure 7B:
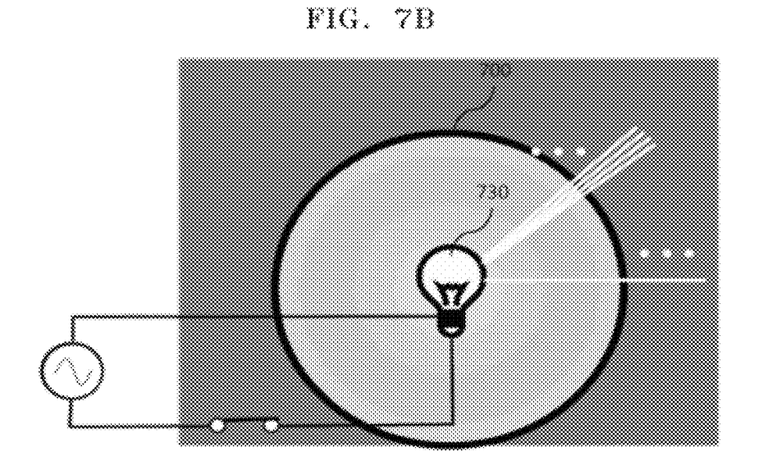
Figure 7C:
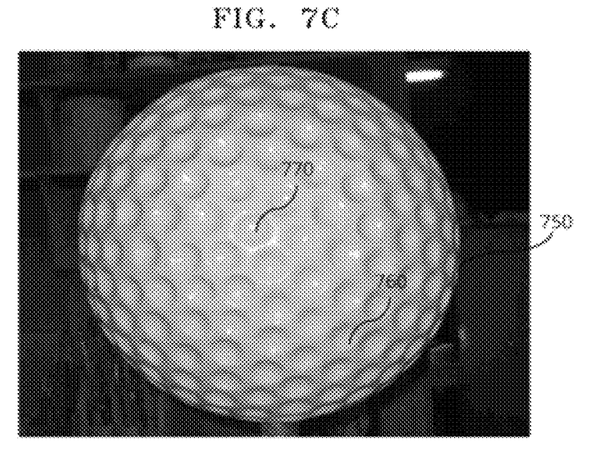

FIGS. 7A, 7B, and 7C are diagrams showing embodiments using spheres as reference scales. FIG. 7A shows a case in which holes are formed in a sphere at a regular interval. Furthermore, FIG. 7B shows a case in which a light emitting object is installed inside a sphere, so that light is emitted through the holes. Furthermore, FIG. 7C shows a case in which concavityconcavities of a same size are formed on a sphere, like a golf ball, and the largest and brightest portion becomes a portion perpendicular to a direction of a camera.

As shown in FIG. 7A, holes 710 are formed in a spherical reference scale 700 at a regular interval, and, as shown in FIG. 7B, a light bulb 730 capable of emitting light is arranged in the spherical reference scale 700, so that light is emitted through the holes 710. Here, the light bulb may be turned off or, in case of an indoor environment, an external light source may be turned off only when precise values are to be acquired. In this case, intensity of emitted light is measured, and a hole corresponding to the greatest light intensity is determined as a reference hole. Vertical and horizontal angle of the reference hole may be determined according to a number of the holes 710. Here, vertical and horizontal direction angels between a camera and an object may be measured by using the angles of the reference hole.

Furthermore, as shown in FIG. 7, concavityconcavities 760 and 770 may be densely formed in a sphere without a light source. In this case, a portion corresponding to a slope surface with respect to a camera may be seen as the largest portion or may be seen as the brightest portion or the darkest portion due to reflection of light. For example, if a light source is located at a same orientation as a camera, the brightest concavity may be determined as a reference concavity. However, if a light source is at an orientation opposite to that of a camera, the darkest concavity may be determined as a reference concavity. Next, direction angles between the camera and an object may be measured based on the determined reference concavity. Like in FIG. 7B, vertical and horizontal angle of the reference concavity may be determined according to a number of the concavityconcavities 760 and 770.

Figure 8:
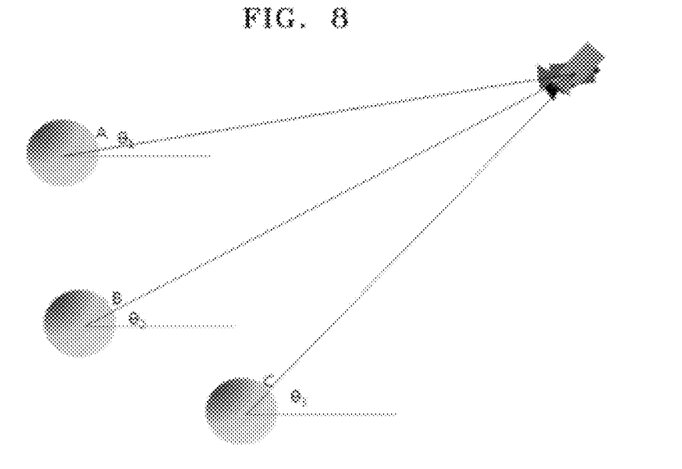
FIG. 8 shows that vertical direction angle varies according to position of a spherical reference scale.

FIG. 8 shows that vertical direction angle varies according to position of a spherical reference scale.

As shown in FIG. 8, in a photograph taken by a camera, the brightest portion is where the sphere and the camera form a straight line. Therefore, if direction angle corresponding to each of holes is marked or known in advance, direction angles of the brightest portion may be determined immediately.

Figure 9:
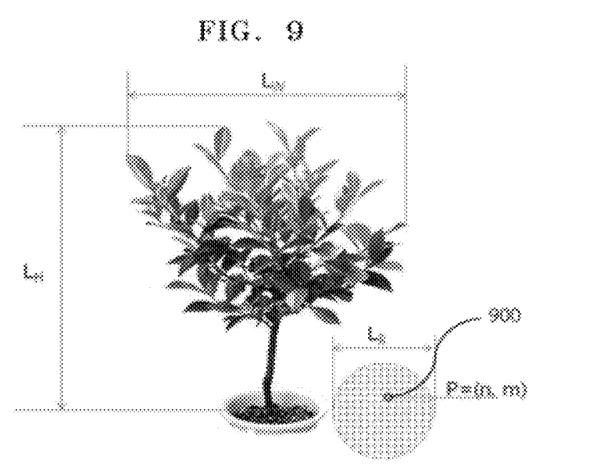
FIG. 9 is a diagram showing a case in which a plant, which is an object of which size is to be measured, and a spherical reference scale are arranged next to each other.

FIG. 9 is a diagram showing a case in which a plant, which is an object of which size is to be measured, and a spherical reference scale are arranged next to each other. FIG. 9 shows a case in which a camera photographs a seedling from above the seedling in a tilted angle.

Width of a plant is not relevant to viewing angles, and thus a width $L_W$ may be determined by using multiples of $L_R$. For example, if $L_R$ is actually 10 cm and $L_W$ in a photograph is three times bigger than $L_R$, the actual length of $L_W$ is 30 cm. However, height of a tree cannot be measured by comparing $L_H$ and $L_R$ to each other. If a point P 900 is a direction in which a camera and an object are arranged in a same direction, in an equation P=(n, m), n indicates vertical direction angle, that is, latitude, whereas m indicates horizontal direction angle, that is, longitude. In this case, if n=0, a plant to be measured and a camera are arranged in positions parallel to each other. If n=90, the camera is photographing right above the plant. As for m, the value of m may be determined to be increased or decreased as a camera is rotaed clockwise or counterclockwise. If average size of an object is horizontally uniform regardless of directions, the value of m may be meaningless.

Figure 10:
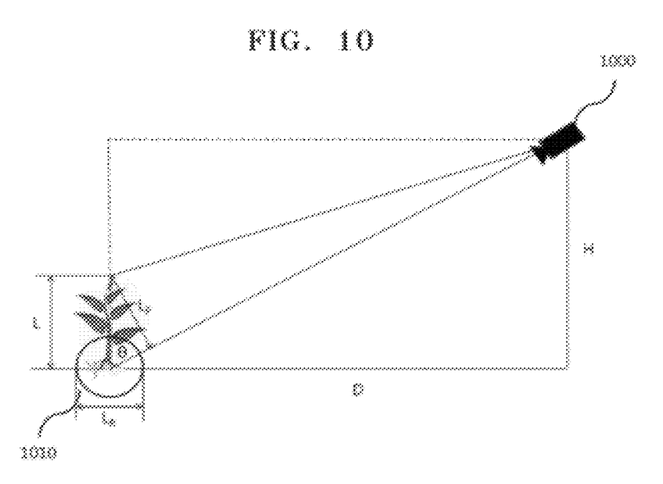
FIG. 10 is a diagram showing a method of compensating vertical size of an object at an arbitrary position.

FIG. 10 is a diagram showing a method of compensating vertical size of an object at an arbitrary position.

A method of calculating an actual length of a plant while height of a camera photographing a plant changes is as shown in FIG. 10. If it is assumed that the camera 1000 photographs at a position that is H higher than the horizontal line, a size $L_P$ shown in a photograph is smaller than a size L taken on the horizontal line, and thus actual size of the object cannot be measured. If the value θ is known, the value L may be immediately calculated by using an equation $L_P/\sin θ$. If it is assumed that the length of a spherical reference scale 1010 in the photograph is $L_R$, a length of the plant in the photograph is $L_P$, and the actual length of the spherical reference scale 1010 is $L_{RR}$, $L_{RR}/L_R$ is an equation for converting a length in the photograph to an actual length.

Therefore, if values $L_R$ and θ are known, the actual height Height of an actual plant may be calculated as shown in Equation 1 below.

$$\text{Height} = L \cdot \left(\frac{L_{RR}}{L_R}\right) = \frac{L_P}{\cos(90-\theta)}\left(\frac{L_{RR}}{L_R}\right) = \frac{L_P}{\sin\theta}\left(\frac{L_{RR}}{L_R}\right) \quad \text{[Equation 1]}$$

Figure 11:
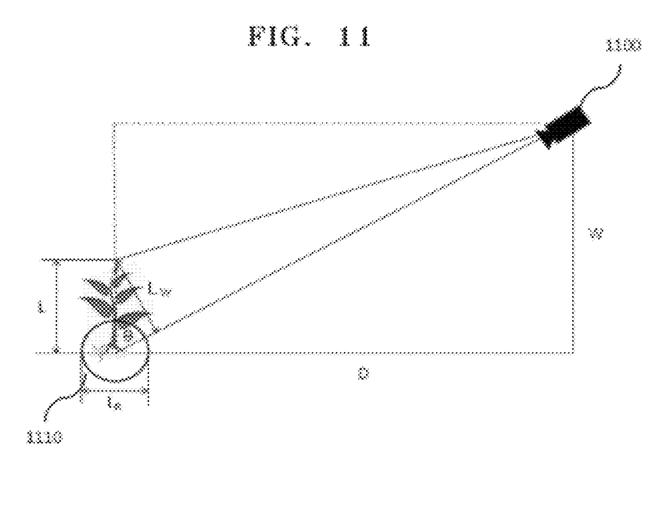
FIG. 11 is a diagram showing a method of compensating horizontal size of an object at an arbitrary position.

FIG. 11 is a diagram showing a method of compensating horizontal size of an object at an arbitrary position.

A method of calculating actual length of a plant when the horizontal direction angle of a camera photographing the plant is as shown in FIG. 11. If a camera 1100 is relocated counterclockwise from the horizontal line by a distance W and photographs, length $L_W$ in a photograph is smaller than length L taken at the horizontal line, and thus actual size cannot be measured. If the value θ is known, the value L may be immediately calculated by using an equation $L_W$/sin θ. If it is assumed that the length of a spherical reference scale 1010 in the photograph is $L_R$, a horizontal length of the plant in the photograph is $L_W$, and the actual length of the spherical reference scale 1010 is $L_{RR}$, $L_{RR}/L_R$ is an equation for converting a length in the photograph to an actual length. Therefore, if values $L_R$ and θ are known, the actual width Width of an actual plant may be calculated as shown in Equation 2 below.

$$\text{Width} = L \cdot \left(\frac{L_{RR}}{L_R}\right) = \frac{L_W}{\cos(90-\theta)}\left(\frac{L_{RR}}{L_R}\right) = \frac{L_W}{\sin\theta}\left(\frac{L_{RR}}{L_R}\right) \quad \text{[Equation 2]}$$

Figure 12:
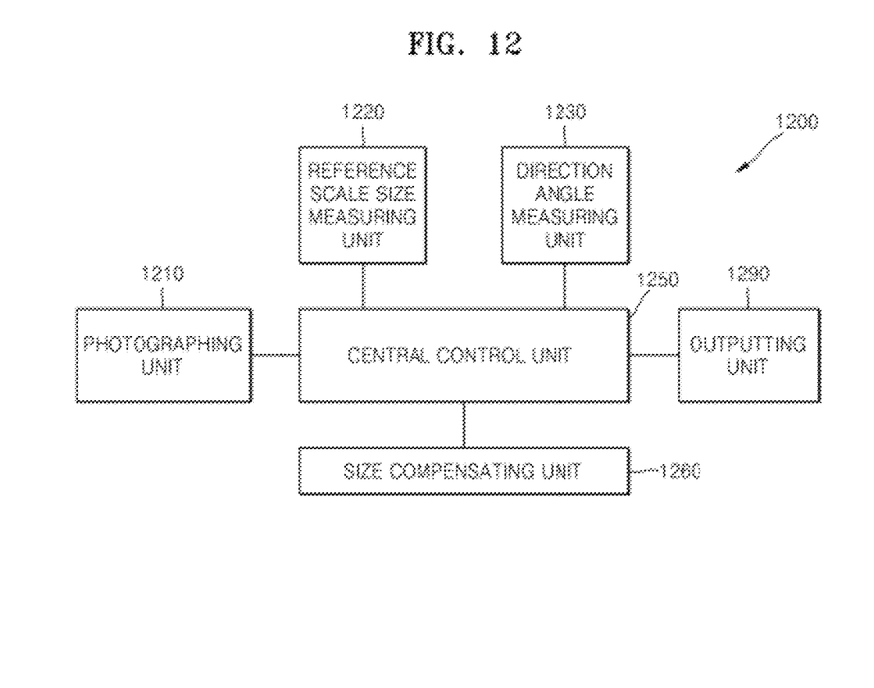

FIG. 12 is a block diagram of an object size measuring apparatus 1200 according to another embodiment of the present invention.

The object size measuring apparatus 1200 according to the present invention includes a photographing unit 1210, a reference scale size measuring unit 1220, a direction angle measuring unit 1230, a size compensating unit 1260, and an outputting unit 1290. A central control unit 1250 controls the components as stated above.

The photographing unit 1210 takes a photograph by using a camera. The reference scale size measuring unit 1220 recognizes a reference scale in the photograph and measures size of the recognized reference scale.

Next, the direction angle measuring unit 1230 measures a vertical direction angle and a horizontal direction angle between the camera and an object by using image properties of the recognized reference scale. As described above, any of various reference scales may be used for measuring direction angles.

Next, the size compensating unit 1260 recognizes the object in the photograph taken by the photographing unit 1210 and measures vertical size and horizontal size of the recognized object. The measured sizes are then compensated by the size compensating unit 1260 based on size of the reference scale, the actual size of the reference scale, and the vertical and horizontal direction angles. The method of compensating size is as described above with reference to FIGS. 10 and 11.

The outputting unit 1290 outputs the compensate actual size to a user.

The invention may be applied to a wide area facility horticulture or a plant factory, where a single camera is installed above a cultivation field and collect data regarding growth and development of a plurality of sample crops by periodically measuring heights and widths of the sample crops.

According to embodiments of the present invention, in a case of measuring sizes of a plurality of objects distributed throughout a wide area by using a photograph taken by using a camera or a CCTV camera of which angle and magnification ratio are adjustable, errors due to a distance and horizontal and vertical direction angles with respect to the objects may be eliminated. Therefore, sizes of the objects may be easily and precisely measured.

Particularly, in a case of frequently measuring an object of which size or position changes, size of such an object may be easily and precisely measured according to the present invention.

The embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of measuring sizes of objects in a photograph including the objects and a reference scale, the method comprising:

taking the photograph by using a camera;

recognizing the reference scale in the photograph and measuring a size of the recognized reference scale in the photograph;

measuring a vertical direction angle and a horizontal direction angle between the camera and the objects by using image properties of the recognized reference scale;

recognizing the objects in the photograph and measuring vertical sizes and horizontal sizes of the recognized objects in the photograph; and acquiring actual vertical sizes and actual horizontal sizes of the objects by compensating the measured vertical size and the measured horizontal size of the recognized objects in the photograph based on the size of the recognized reference scale in the photograph, the actual size of the reference scale, and the vertical and horizontal direction angles, wherein the measuring the vertical direction angle is performed based on a depth distance and a vertical distance between the reference scale and the camera and the measuring the horizontal direction angle is performed based on the depth distance and a horizontal distance from the reference scale to the camera, wherein the reference scale comprises: a light source arranged at a sphere center and a plurality of holes that are formed on the surface of the reference scale and are apart from each other at a regular interval, and wherein the step of measuring direction angles comprises:

measuring intensity of light emitted through recognized holes and determining a hole through which light with the greatest intensity is emitted as a reference hole; and measuring the vertical and horizontal direction angles by using the reference hole.

2. The method of claim 1, further comprising repeatedly photographing the objects a predetermined period of time after the step of compensating the measured vertical size and the measured horizontal size of the objects.

3. The method of claim 1, A method of measuring sizes of objects in a photograph including the objects and a reference scale, the method comprising:
taking the photograph by using a camera;
recognizing the reference scale in the photograph and measuring a size of the recognized reference scale in the photograph;
measuring a vertical direction angle and a horizontal direction angle between the camera and the objects by using image properties of the recognized reference scale;
recognizing the objects in the photograph and measuring vertical sizes and horizontal sizes of the recognized objects in the photograph; and
acquiring actual vertical sizes and actual horizontal sizes of the objects by compensating the measured vertical size and the measured horizontal size of the recognized objects in the photograph based on the size of the recognized reference scale in the photograph, the actual size of the reference scale, and the vertical and horizontal direction angles,
wherein the measuring the vertical direction angle is performed based on a depth distance and a vertical distance between the reference scale and the camera and the measuring the horizontal direction angle is performed based on the depth distance and a horizontal distance from the reference scale to the camera,
wherein the reference scale is a sphere in which concavities are formed on the surface of the reference scale and are apart from each other at a regular interval, and
wherein the step of measuring direction angles comprises:
determining the brightest concavity in a case where a light source is arranged at a same orientation as the camera or the darkest concavity in a case where the light source is arranged at an orientation opposite to that of the camera as a reference concavity; and
measuring the vertical and horizontal direction angles by using the reference concavity.

4. The method of claim 1, wherein the step of compensating the measured vertical size and the measured horizontal size of the objects comprises:
measuring the vertical size according to an equation $$\frac{L_P}{\sin\theta}\left(\frac{L_{RR}}{L_R}\right)$$

(where $\theta$ indicates the vertical direction angle, $L_P$ indicates measured vertical size of an object, $L_R$ indicates measured size of a reference scale, and $L_{RR}$ indicates the actual size of the reference scale); and
measuring the horizontal size according to an equation $$\frac{L_W}{\sin\theta}\left(\frac{L_{RR}}{L_R}\right)$$

(where $\theta$ indicates the horizontal direction angle, $L_W$ indicates measured horizontal size of an object, $L_R$ indicates the measured size of the reference scale, and $L_{RR}$ indicates the actual size of the reference scale).

5. An apparatus for measuring sizes of objects in a photograph including the objects and a reference scale, the apparatus comprising:
a photographing unit which takes the photograph by using a camera;
a reference scale measuring unit which recognizes the reference scale in the photograph and measures a size of the recognized reference scale in the photograph;
a direction angle measuring unit which measures a vertical direction angle and a horizontal direction angle between the camera and the objects by using image properties of the recognized reference scale;
a size compensating unit which recognizes the objects in the photograph, measures vertical sizes and horizontal sizes of the recognized objects in the photograph, and acquires actual vertical sizes and actual horizontal sizes of the objects by compensating the measured vertical size and the measured horizontal size of the recognized objects in the photograph based on the size of the recognized reference scale in the photograph, the actual size of the reference scale, and the vertical and horizontal direction angles; and
a controller configured to control the photographing unit, the reference scale measuring unit, the direction angle measuring unit, and the size compensating unit,
wherein the direction angle measuring unit measures the vertical direction angle based on a depth distance and a vertical distance between the reference scale and the camera and the horizontal direction angle based on the depth distance and a horizontal distance from the reference scale to the camera wherein the reference scale comprises:
a light source arranged at a sphere center and a plurality of holes that are formed on the surface of the reference scale and are apart from each other at a regular interval, and
wherein the direction angle measuring unit is a unit for measuring intensity of light emitted through recognized holes and determining a hole through which light with the greatest intensity is emitted as a reference hole and for measuring the vertical and horizontal direction angles by using the reference hole.

6. An apparatus for measuring sizes of objects in a photograph including the objects and a reference scale, the apparatus comprising:
a photographing unit which takes the photograph by using a camera;
a reference scale measuring unit which recognizes the reference scale in the photograph and measures a size of the recognized reference scale in the photograph;
a direction angle measuring unit which measures a vertical direction angle and a horizontal direction angle between the camera and the objects by using image properties of the recognized reference scale;
a size compensating unit which recognizes the objects in the photograph, measures vertical sizes and horizontal sizes of the recognized objects in the photograph, and acquires actual vertical sizes and actual horizontal sizes of the objects by compensating the measured vertical size and the measured horizontal size of the recognized objects in the photograph based on the size of the recognized reference scale in the photograph, the actual size of the reference scale, and the vertical and horizontal direction angles; and
a controller configured to control the photographing unit, the reference scale measuring unit, the direction angle measuring unit, and the size compensating unit, wherein the direction angle measuring unit measures the vertical direction angle based on a depth distance and a vertical distance between the reference scale and the camera and the horizontal direction angle based on the depth distance and a horizontal distance from the reference scale to the camera, wherein the reference scale is a sphere in which concavities are formed on the surface of the reference scale and are apart from each other at a regular interval, and the direction angle measuring unit is a unit for determining the brightest concavity in a case where a light source is arranged at a same orientation as the camera or the darkest concavity in a case where the light source is arranged at an orientation opposite to that of the camera as a reference concavity and for measuring the vertical and horizontal direction angles by using the reference concavity.

7. The apparatus of claim 5, wherein the size compensating unit measures the
vertical size according to an equation $$\frac{L_P}{\sin\theta}\left(\frac{L_{RR}}{L_R}\right)$$

(where $\theta$ indicates the vertical direction angle, $L_p$ indicates measured vertical size of an object, $L_R$ indicates measured size of a reference scale, and $L_{RR}$ indicates the actual size of the reference scale), and the size compensating unit measures the horizontal size according to an equation $$\frac{L_W}{\sin\theta}\left(\frac{L_{RR}}{L_R}\right)$$

(where $\theta$ indicates the horizontal direction angle, $L_w$ indicates measured horizontal size of an object, $L_R$ indicates the measured size of the reference scale, and $L_{RR}$ indicates the actual size of the reference scale).

8. The method of claim 1, wherein the measuring the vertical direction angle and the horizontal direction angle is performed by determining a largest surface or a surface having a least distorted shape from among surfaces of the recognized reference scale as a reference surface.

* * * * *